(No Model.)

W. J. GOING.
SUPPORT FOR INCANDESCENT LAMPS, &c.

No. 598,221. Patented Feb. 1, 1898.

Witnesses.
H. S. Duell
Alvin D. Allen

Inventor.
William J. Going
By C. H. Duell
his Attorney.

UNITED STATES PATENT OFFICE.

WILLIAM JOSEPH GOING, OF AMSTERDAM, NEW YORK, ASSIGNOR OF ONE-HALF TO LEONARD WELDON, OF SAME PLACE.

SUPPORT FOR INCANDESCENT LAMPS, &c.

SPECIFICATION forming part of Letters Patent No. 598,221, dated February 1, 1898.

Application filed July 21, 1897. Serial No. 645,330. (No model.)

*To all whom it may concern:*

Be it known that I, WILLIAM JOSEPH GOING, of Amsterdam, in the county of Montgomery, in the State of New York, have invented new and useful Improvements in Supports for Incandescent Lamps, &c., of which the following, taken in connection with the accompanying drawings, is a full, clear, and exact description.

My invention relates to adjustable supports or brackets for incandescent lamps, &c.; and the object is to provide a simple and inexpensive support that may be easily and quickly adjusted universally.

To this end my invention consists in the combination with a bracket provided with a spherical socket; a ball within the socket, having a threaded aperture extending therethrough, and a threaded tube extending through the aperture and adapted to bear upon the spherical surface of the socket, said tube being slotted longitudinally; a tube within the outer tube connected to the latter through the slot and adapted to slide therein; a friction device to slide on the exterior of the outer tube and a lamp carried on the end of the outer tube; and my invention consists in certain other combinations of parts hereinafter described, and specifically set forth in the claims.

Figure 1:
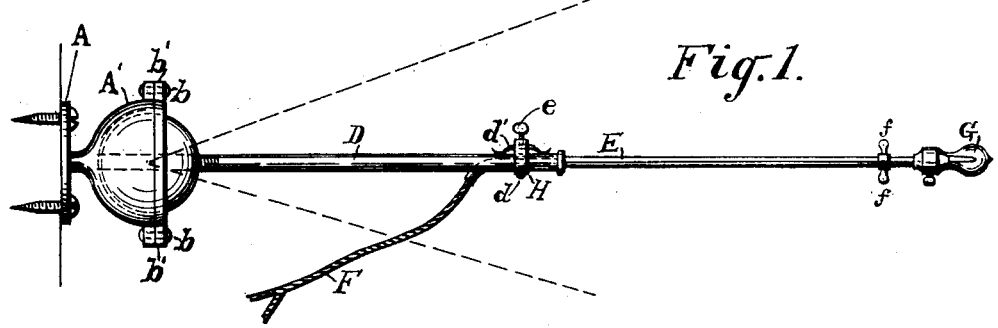
Figure 2:
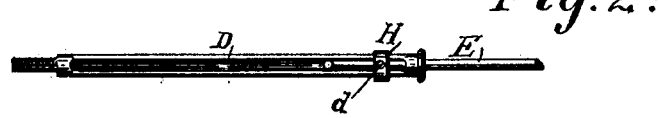
Figure 3:
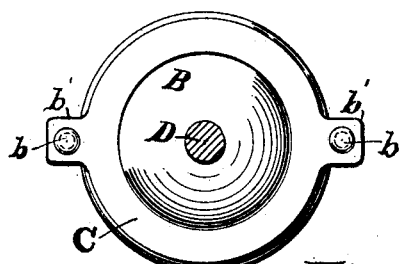
Figure 4:
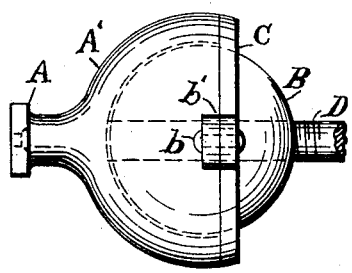
Figure 5:
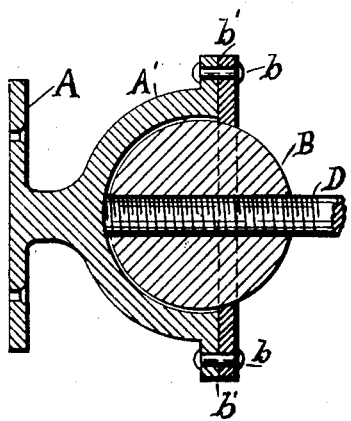

In the drawings hereto annexed and forming a part of this specification, Figure 1 is a side elevation of my improved adjustable support fixed to a side wall. Fig. 2 is a view of the slotted side of the outer tube. Fig. 3 is an enlarged front view of the bracket, the rod being shown in cross-section. Fig. 4 is a side elevation of the same, and Fig. 5 is a longitudinal sectional view.

Referring specifically to the drawings, A is the bracket, adapted to be secured to the wall and having a projection A' with a large spherical socket in its end to receive the ball B. It will be obvious that the ball, though shown solid, may be made hollow or may be an incomplete sphere, in order to decrease its weight, without departing from my invention.

The ring C on the edge of the socket is beveled to fit closely to or conform to the curvature of the ball, so that it may be turned easily in the socket without being removed. Said ring is secured to the edge of the projection by a pair of screws or rivets $b\,b$, passing through lugs $b'\,b'$.

A threaded aperture extends diametrically through the ball B, through which the outer tube D of the extensible part of the support passes. Said tube may be solid on the threaded end passing through the ball. When the tube is slightly unscrewed, so that it does not bear upon the wall of the spherical cavity or socket, said tube and ball may be turned in any direction from the bracket. When the tube is turned or moved to extend in the desired direction from the wall, it may be fixed in this position by simply turning it into the ball until its end impinges upon the spherical wall of the socket.

The tube D is slotted longitudinally on one side to permit a small yoke H to be secured by a screw $d$ to the inner tube E and to slide on the outer tube when the inner tube is moved in or out. The slide or yoke H is provided with a curved spring $d'$, which bears with its ends upon the tube D and is adjusted by means of a screw $e$, passing through the yoke and bearing in a cavity in the center of the spring. The inner tube E has its inner end preferably bent to pass through the slot in the outer tube, so that there will be no wear upon the flexible conducting-cord F, passing through the tube upon the side walls of the slot when the inner tube is moved.

Fig. 1 shows an ordinary incandescent lamp G and its socket on the free end of the inner tube E. The projections $f$ serve as a handle or means for operating the inner tube, or rotate the outer tube, and, in fact, as a means for operating the device generally, as will be obvious. When a gas-burner is mounted on the end of the tube E, a flexible rubber pipe is connected with the other end of the tube.

Having described my invention, what I claim as new, and desire to secure by Letters Patent, is—

1. In an adjustable support, the combination with a bracket provided with a spherical socket, of a ball within the socket having a threaded aperture extending therethrough, and a threaded tube extending through the aperture and adapted to bear upon the spherical surface of the socket, said tube being slotted longitudinally, a tube within the outer tube connected to the latter through the slot and adapted to slide therein, a friction device to slide on the exterior of the outer tube, and a lamp carried on the end of the outer tube, as set forth.

2. In an adjustable support, the combination with a bracket adapted to be secured to a wall, and having a projection containing a spherical socket in its end, of a ball within the socket having a threaded aperture therein, a threaded tube extending through the ball, and adapted to bear upon the spherical surface of the socket, a ring secured to the edge of the socket and having an inner beveled edge to bear upon the ball, said tube being slotted longitudinally, a tube to slide in the outer tube and extend through the slot, a conducting-cord passing through the tubes, an adjustable tension device secured to the inner tube and movable on the exterior of the outer tube, and an incandescent lamp mounted on the end of the inner tube, substantially as described and shown.

In testimony whereof I have hereunto signed my name.

WILLIAM JOSEPH GOING. [L. S.]

Witnesses:
 JAMES A. SMEALLIE,
 HENRY V. BURKE.